(12) United States Patent
Binek et al.

(10) Patent No.: US 12,385,407 B1
(45) Date of Patent: Aug. 12, 2025

(54) ADDITIVELY MANUFACTURED TURBINE VANE CLUSTER

(71) Applicant: RTX Corporation, Farmington, CT (US)

(72) Inventors: Lawrence A. Binek, Glastonbury, CT (US); Paul M. Lutjen, Kennebunkport, ME (US); Jose R. Paulino, Jupiter, FL (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/667,855

(22) Filed: May 17, 2024

(51) Int. Cl.
| | |
|---|---|
| *F01D 9/04* | (2006.01) |
| *B22F 5/04* | (2006.01) |
| *B22F 10/28* | (2021.01) |
| *B33Y 10/00* | (2015.01) |
| *B33Y 80/00* | (2015.01) |

(52) U.S. Cl.
CPC ............. *F01D 9/041* (2013.01); *B22F 5/04* (2013.01); *B22F 10/28* (2021.01); *B33Y 10/00* (2014.12); *B33Y 80/00* (2014.12)

(58) Field of Classification Search
CPC ......... F01D 9/041; B33Y 10/00; B33Y 80/00; B22F 5/04; B22F 10/28; Y10T 428/24314; F23R 3/002; F05D 2250/184
See application file for complete search history.

(56) References Cited

U.S. PATENT DOCUMENTS

| | | | | |
|---|---|---|---|---|
| 2,905,279 | A * | 9/1959 | Moyer | F16D 55/40 188/218 XL |
| 3,301,356 | A * | 1/1967 | Pompa | F16D 65/12 188/218 XL |
| 3,403,758 | A * | 10/1968 | Stout | F16D 65/12 188/218 XL |
| 3,781,125 | A * | 12/1973 | Rahaim | F01D 9/042 415/115 |
| 3,904,000 | A * | 9/1975 | Berger | F16D 65/121 188/218 XL |
| 4,536,932 | A * | 8/1985 | Athey | F01D 5/34 72/46 |
| 5,071,313 | A * | 12/1991 | Nichols | F01D 11/08 415/173.3 |
| 5,593,276 | A | 1/1997 | Proctor et al. | |
| 5,850,895 | A * | 12/1998 | Evrard | F16D 65/12 188/218 XL |
| 7,097,422 | B2 | 8/2006 | Rice et al. | |

(Continued)

FOREIGN PATENT DOCUMENTS

| | | | | |
|---|---|---|---|---|
| DE | 102015207760 | A1 * | 11/2016 | ............... F01D 9/02 |
| EP | 2599963 | A2 * | 6/2013 | ............. F01D 25/06 |

OTHER PUBLICATIONS

Translation DE-102015207760-A1 (Year: 2025).*
Translation EP-2599963-A2 (Year: 2025).*

*Primary Examiner* — J. Todd Newton
(74) *Attorney, Agent, or Firm* — Bachman & LaPointe, P.C.

(57) ABSTRACT

An additively manufactured vane cluster has a platform, a shroud, and airfoils joining the platform to the shroud. The platform has openings, each opening between a respective two of the airfoils and forming accommodating differential thermal expansion of a leading end of the platform relative to a trailing end of the platform.

20 Claims, 14 Drawing Sheets

(56) References Cited

U.S. PATENT DOCUMENTS

| | | | |
|---|---|---|---|
| 7,887,299 B2* | 2/2011 | Xiao | F01D 5/34 |
| | | | 416/500 |
| 8,511,089 B2* | 8/2013 | Bastnagel | F23R 3/002 |
| | | | 60/754 |
| 9,506,365 B2* | 11/2016 | Smoke | F01D 11/005 |
| 10,731,489 B2* | 8/2020 | Uecker | F01D 11/005 |
| 10,941,944 B2 | 3/2021 | Binek | |
| 11,359,543 B2 | 6/2022 | Binek et al. | |
| 11,614,002 B2 | 3/2023 | Binek et al. | |
| 11,814,991 B1* | 11/2023 | Rogers | F01D 9/042 |
| 11,885,241 B1* | 1/2024 | Rogers | F01D 9/041 |
| 2006/0013685 A1* | 1/2006 | Ellis | F01D 9/041 |
| | | | 415/210.1 |
| 2006/0099078 A1* | 5/2006 | Rice | F01D 5/34 |
| | | | 416/234 |
| 2008/0025842 A1 | 1/2008 | Marini et al. | |
| 2011/0023496 A1* | 2/2011 | Bastnagel | F23R 3/002 |
| | | | 60/752 |
| 2014/0260281 A1* | 9/2014 | Innes | B23K 35/228 |
| | | | 83/49 |
| 2018/0328187 A1 | 11/2018 | Oke | |
| 2020/0063578 A1* | 2/2020 | Notarnicola | B29C 64/153 |
| 2021/0388728 A1* | 12/2021 | Hall | C04B 35/587 |

* cited by examiner

ADDITIVELY MANUFACTURED TURBINE VANE CLUSTER

BACKGROUND

The disclosure relates to gas turbine engines. More particularly, the disclosure relates to turbine vane clusters for attritable engines.

Gas turbine engines (used in propulsion and power applications and broadly inclusive of turbojets, turboprops, turbofans, turboshafts, prop fans, industrial gas turbines, and the like) have spawned attritable variants particularly for turbojet, turbofan, and turboprop uncrewed aerial vehicles (UAV).

Example attritable engines are shown in U.S. Pat. No. 11,359,543B2 (the '543 patent) of Binek et al., issued Jun. 14, 2022, and entitled "Attritable Engine Additively Manufactured Inlet Cap" and U.S. Pat. No. 11,614,002B2 (the '002 patent) of Binek et al., issued Mar. 28, 2023, and entitled "Split Case Structure for a Gas Turbine Engine".

The disclosures of the '543 patent and '002 patent are incorporated by reference herein in their entireties as if set forth at length.

SUMMARY

One aspect of the disclosure involves a vane cluster comprising: a platform; a shroud; and a plurality of airfoils joining the platform to the shroud. The platform, shroud and airfoils are portions of a single piece. The platform has a plurality of openings, each opening between a respective two of the airfoils; the openings extend from a leading end of the platform toward a trailing end of the platform. The openings have a convoluted shape such that in transverse section a radial line has at least four intersections with the platform.

In a further embodiment of any of the foregoing embodiments, additionally and/or alternatively, the convoluted shape may exist over at least 50% of a total axial length of the opening, preferably, at least 70%.

In a further embodiment of any of the foregoing embodiments, additionally and/or alternatively, the slot may include a leading portion having fewer, if any, such intersections but blocking downstream line of sight into a portion of the slot having the convoluted shape. The leading portion may form a circumferential and upstream-to-downstream (e.g., aft-to-fore) zigzag footprint contrasted with the radial and circumferential convolutions in the convoluted portion. The leading portion may block axial flow, whereas the portion of the slot having the convoluted profile may block radial flow.

In a further embodiment of any of the foregoing embodiments, additionally and/or alternatively, the vane cluster is a full annulus.

In a further embodiment of any of the foregoing embodiments, additionally and/or alternatively, exactly every third inter-airfoil space has a said opening.

In a further embodiment of any of the foregoing embodiments, additionally and/or alternatively, the platform comprises an outer wall having the openings; an inner wall spaced radially inward of the outer wall; and a turn joining the inner wall and outer wall.

A further embodiment of any of the foregoing embodiments may additionally and/or alternatively include: a diffuser including diffuser vanes extending radially outward from the shroud; a case wall at outer diameter ends of the diffuser vanes; and a combustor body having an inner wall extending forward to merge with the platform along an outer diameter of the platform inner wall.

In a further embodiment of any of the foregoing embodiments, additionally and/or alternatively, said radial line has six said intersections.

In a further embodiment of any of the foregoing embodiments, additionally and/or alternatively, the opening shape defines: at a first circumferential side, a channel opening toward an opposite second circumferential side; and at the second circumferential side, a projection into the channel.

In a further embodiment of any of the foregoing embodiments, additionally and/or alternatively, the projection has one or more of: a necked area of reduced radial span; and a porous zone, optionally being said necked area if present, of at greater porosity than an adjacent portion of the platform, with a porosity difference of at least 50%.

In a further embodiment of any of the foregoing embodiments, additionally and/or alternatively, one or more of: the openings have an axial span of 50% to 130% of an axial span of the airfoils at the platform; no more than half of inter-airfoil spaces have said openings; and the openings have an axial span of 30% to 90% of an axial span of the platform.

In a further embodiment of any of the foregoing embodiments, additionally and/or alternatively, a gas turbine engine includes the vane cluster as a turbine section vane cluster and further comprising: a compressor section a combustor; and a gaspath defining a downstream direction sequentially through the compressor section, combustor, and turbine section.

In a further embodiment of any of the foregoing embodiments, additionally and/or alternatively, the engine is a single-spool engine, the compressor section is a centrifugal compressor, and the combustor is a reverse flow combustor.

In a further embodiment of any of the foregoing embodiments, additionally and/or alternatively, the vane cluster further comprises: a diffuser including diffuser vanes extending radially outward from the shroud; a case wall at outer diameter ends of the diffuser vanes; and a combustor body.

A further embodiment of any of the foregoing embodiments may additionally and/or alternatively include the method comprising additive manufacture forming the openings.

In a further embodiment of any of the foregoing embodiments, additionally and/or alternatively, the additive manufacturing comprises powder bed fusion.

A further embodiment of any of the foregoing embodiments may additionally and/or alternatively include the method comprising: running the vane cluster as a turbine vane cluster in a gas turbine engine; and the running causing thermal expansion of the leading end relative to the trailing end and circumferentially closing the openings.

In a further embodiment of any of the foregoing embodiments, additionally and/or alternatively, the running causes contact of a projection at one circumferential side of the opening with a channel at the other circumferential side of the opening.

In a further embodiment of any of the foregoing embodiments, additionally and/or alternatively, the contact includes rupturing a root section of the projection.

A further aspect of the disclosure involves vane cluster comprising: a platform; a shroud; and a plurality of airfoils joining the platform to the shroud. The platform has a plurality of openings, each opening between a respective two of the airfoils. The openings extend from a leading end of the platform. The openings define: at a first circumferential side, a channel opening toward an opposite second circumferential side; and at the second circumferential side a projection into the channel.

A further aspect of the disclosure involves a vane cluster comprising: a platform; a shroud; and a plurality of airfoils joining the platform to the shroud. The platform has a plurality of openings, each opening between a respective two of the airfoils and forming means for accommodating differential thermal expansion of a leading end of the platform relative to a trailing end of the platform.

In a further embodiment of any of the foregoing embodiments, additionally and/or alternatively, the vane cluster is a single-piece full annulus.

A further aspect of the disclosure involves a vane cluster comprising a platform having: an outer diameter wall; an inner diameter wall; and a turn joining the outer diameter wall and inner diameter wall. A plurality of airfoils join the platform outer diameter wall to a shroud. The platform outer diameter wall has a plurality of openings, each opening between a respective two of the airfoils and forming means for accommodating differential thermal expansion of the outer diameter wall and inner diameter wall.

A further aspect of the disclosure involves an additively manufactured vane cluster having a platform, a shroud, and airfoils joining the platform to the shroud. The platform has openings, each opening between a respective two of the airfoils and forming means for accommodating differential thermal expansion of a leading end of the platform relative to a trailing end of the platform.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

In a modification of the structure shown in the '002 patent above, one or more longitudinal sections of the case or static structure may be unitarily formed as a full annulus rather than circumferentially split structure. Thus, in one example discussed, a forward structure forming a compressor case 61 (FIG. 1) may largely be one single full annulus piece and an aft structure 63 forming a diffuser, combustor body, and turbine case may largely be a second piece 200 (FIG. 2) joined at a joint 65 such as a bolt circle at mating flanges. Such a single piece 200 may be additively manufactured such as via powder bed fusion-laser beam (PBF-LB), selective laser sintering (SLS), or directed energy deposition (DED). Example material is a nickel-based superalloy such as the Inconel family (e.g., Inconel 625). Nevertheless, features discussed below may be applied to split cases and may be applied to axially and/or radially less extensive pieces (e.g., wherein the combustor body (walls) and/or the diffuser are not part of the single piece).

Figure 2:
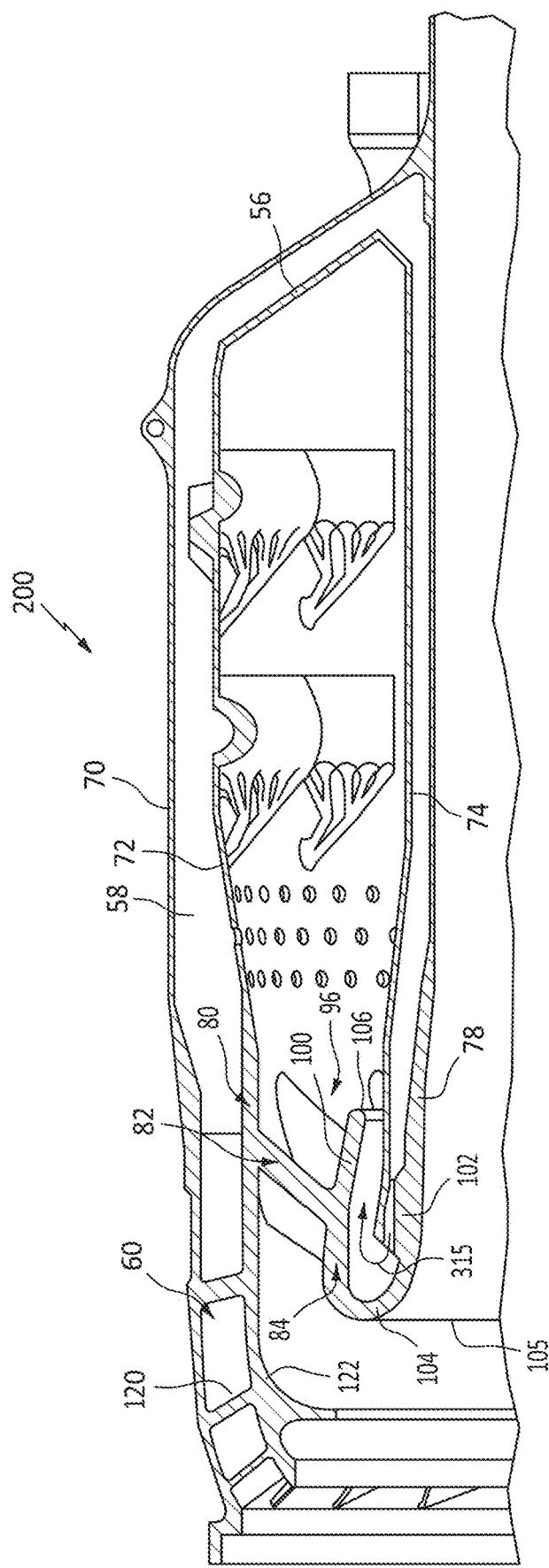
FIG. 2 is a view of a single-piece diffuser/combustor/turbine inlet nozzle body.

For use in a such a reverse flow combustor gas turbine engine, FIG. 2 shows such a second piece 200 including: the diffuser 60; combustor wall structures 56,72,74; combustor exit nozzle or turbine inlet vane ring 82; and turbine section wall structures 78. The nozzle 82 has a circumferential array of airfoils or vanes 96 extending radially from inboard ends at an inner platform 84 to outboard ends at an outer shroud or platform 80. In the reverse flow combustor situation, the airfoils 96 have upstream leading edges aft of forward trailing edges. The inner platform 84 is configured to provide the inside of a turn which turns the gaspath radially inward and back aft/rearward form the reverse flow combustor. Thus, the example inner platform 84 has a generally C-shaped central longitudinal section with a radially outer wall section 100 and, as portions of the turbine wall structure 78, a radially inner wall section 102 and a turn 104 at a forward end of the inner platform 84. The outer wall thus extends forward/downstream from an aft/upstream leading edge or rim 106 to a forward junction with the turn 104. Similarly, the inner wall extends aft/downstream from a junction with the turn 104.

Figure 1:
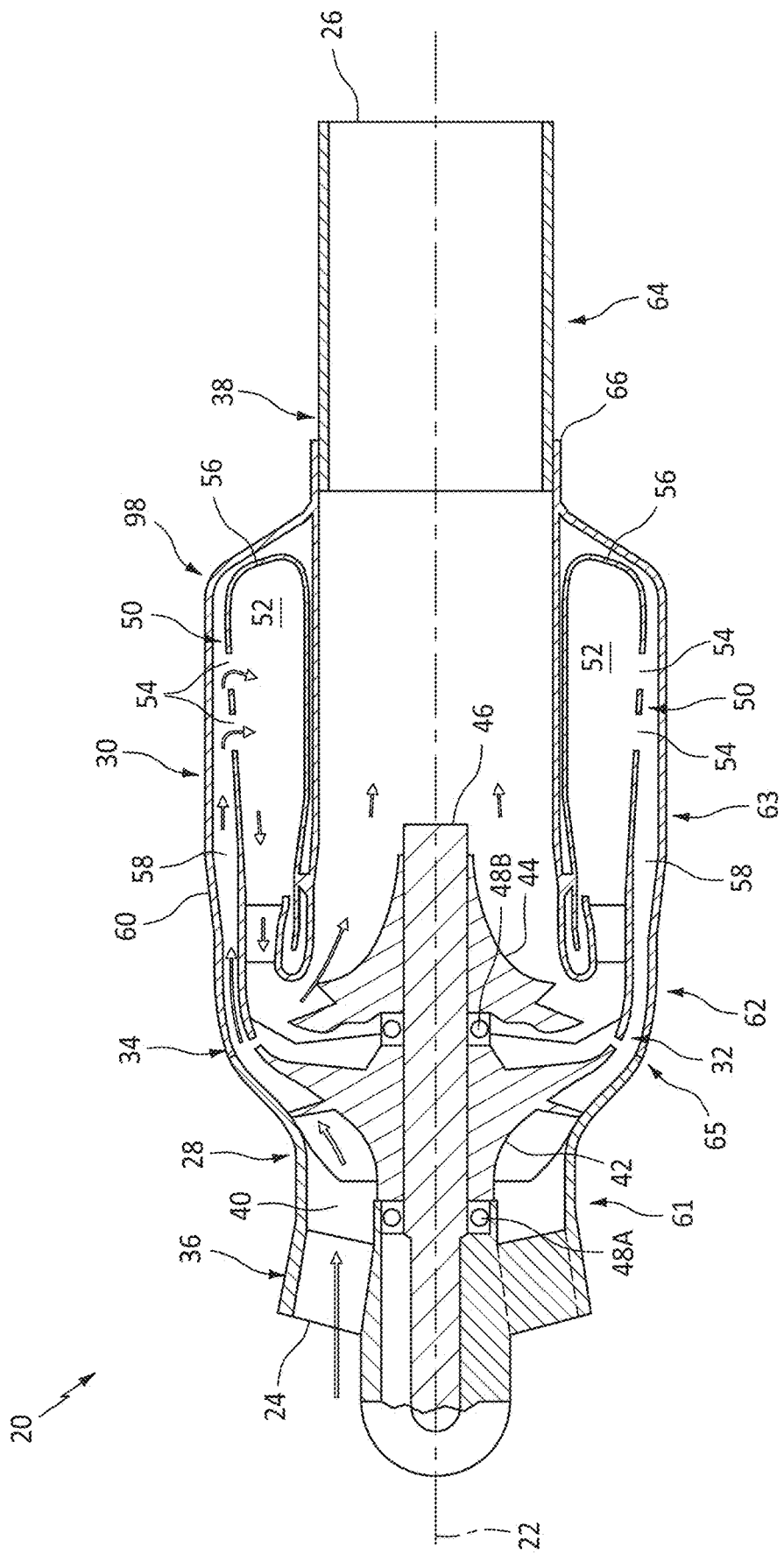
FIG. 1 is a schematic central longitudinal sectional view of a gas turbine engine.

FIG. 1 is a schematic central longitudinal sectional illustration of a gas turbine engine 20. The gas turbine engine 20 of FIG. 1 is configured as a single spool, radial-flow turbojet turbine engine. This gas turbine engine 20 is configured for propelling an aircraft such as, but not limited to, an unmanned aerial vehicle (UAV), a drone or any other manned or unmanned aircraft or self-propelled projectile. The present disclosure, however, is not limited to such an example turbojet turbine engine configuration nor to an aircraft propulsion system application. For example, the gas turbine engine 20 may alternatively be configured as a turboshaft, a turboprop, an auxiliary power unit (APU), and/or an industrial gas turbine.

The gas turbine engine 20 of FIG. 1 extends axially along an axial centerline 22 between a forward, upstream airflow inlet 24 and an aft, downstream exhaust 26. This axial centerline 22 may also be a rotational axis for various components within the gas turbine engine 20.

The gas turbine engine 20 includes a compressor section 28, a combustor section 30, and a turbine section 32. The gas turbine engine 20 also includes a static engine structure 34.

This static engine structure 34 houses the compressor section 28, the combustor section 30, and the turbine section 32. The static engine structure 34 of FIG. 1 also forms an inlet section 36 and an exhaust section 38 for the gas turbine engine 20, where the inlet section 36 forms the airflow inlet 24 and the exhaust section 38 forms the exhaust 26.

The engine sections 36, 28, 30, 32 and 38 are arranged sequentially from upstream to downstream along a gaspath or core flowpath 40 that extends through the gas turbine engine 20 from the airflow inlet 24 to the exhaust 26. Each of the engine sections 28 and 32 includes a respective rotor 42 and 44. The example rotors are co-spooled to rotate as a unit. Each of these rotors 42, 44 includes a plurality of rotor blades arranged circumferentially around and connected to at least one respective rotor hub (for centrifugal or disk for axial). The rotor blades, for example, may be formed integral with or mechanically fastened, welded, brazed, adhered and/or otherwise attached to the respective rotor disk(s).

The compressor rotor 42 may be configured as a centrifugal/radial flow rotor. The turbine rotor 44 may also be configured as a radial flow rotor. The compressor rotor 42 is connected to the turbine rotor 44 through a shaft 46. This shaft 46 is rotatably supported by the static engine structure 34 through a plurality of bearings 48A and 48B (generally referred to as 48); e.g., rolling element bearings, journal bearings, etc.

The combustor section 30 includes an example annular combustor 50 with an annular combustion chamber 52. The combustor 50 of FIG. 2 is configured as a reverse flow combustor. Inlets ports/flow tubes 54 into the combustion chamber 52, for example, may be arranged at (e.g., on, adjacent or proximate) and/or towards an aft bulkhead wall 56 of the combustor 50. An outlet from the combustor 50 may be arranged axially aft of an inlet to the turbine section 32. The combustor 50 may also be arranged radially outboard of and/or axially overlap at least a (e.g., aft) portion of the turbine section 32. With this arrangement, the core flowpath 40 of FIG. 1 reverses direction (e.g., from a forward-to-aft direction to an aft-to-forward direction) a first time as the flowpath 40 extends from a diffuser plenum 58 surrounding the combustor 50 into the combustion chamber 52. The core flowpath 40 of FIG. 1 then reverses direction (e.g., from the aft-to-forward direction to the forward-to-aft direction) a second time as the flowpath 40 extends from the combustion chamber 52 into the turbine section 32.

During operation, air enters the gas turbine engine 20 through the inlet section 36 and its airflow inlet 24. The inlet section 36 directs this air from the airflow inlet 24 into the core flowpath 40 and the compressor section 28. The airflow inlet 24 of FIG. 1 thereby forms a forward, upstream inlet to the core flowpath 40 and the compressor section 28. The air within the core flowpath 40 may be referred to as core air. The core air is compressed by the compressor rotor 42 and directed through a diffuser 60 and its plenum 58 into the combustion chamber 52. Fuel is injected and mixed with the compressed core air to provide a fuel-air mixture. This fuel-air mixture is ignited within the combustion chamber 52, and combustion products thereof flow through the turbine section 32 and cause the turbine rotor 44 to rotate. This rotation of the turbine rotor 44 drives rotation of the compressor rotor 42 and, thus, compression of the air received from the airflow inlet 24. The exhaust section 38 receives the combustion products from the turbine section 32. The exhaust section 38 directs the received combustion products out of the gas turbine engine 20 to provide forward engine thrust.

The static engine structure 34 of FIG. 1 may include some or all static engine components included in the gas turbine engine 20. Herein, the term "static" may describe a component that does not rotate with the rotating assembly or spool (e.g., an assembly of the rotors 42 and 44 and the shaft 46) during gas turbine engine operation. A static component, for example, may refer to any component that remains stationary during gas turbine engine operation such as, but not limited to, a wall, a liner, a strut, a fixed vane, a fuel nozzle, a conduit, etc. The static engine structure 34 of FIG. 1, for example, includes a forward, case structure 62 and an aft, exhaust duct structure 64.

Figure 1A:
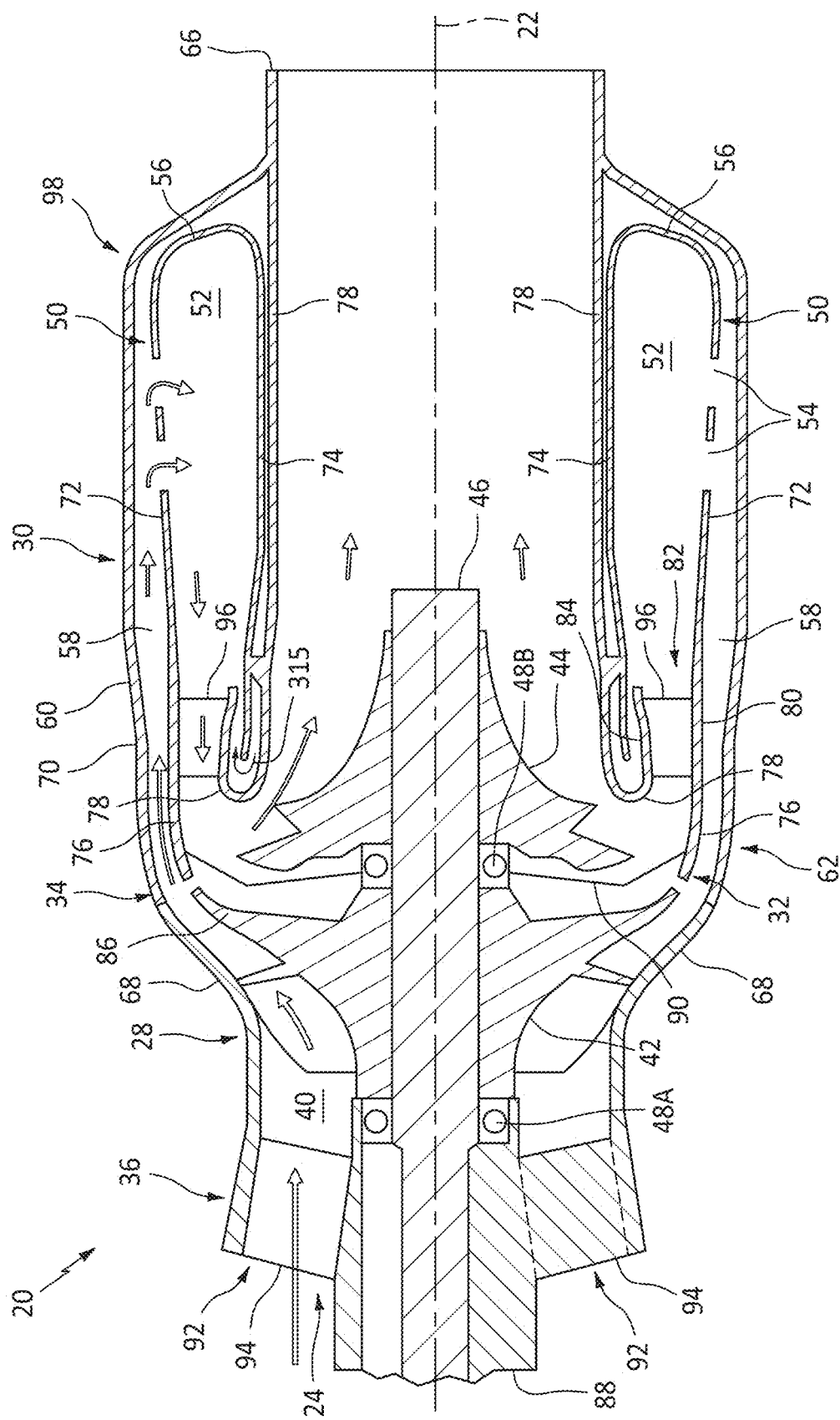
FIG. 1A is an enlarged view of a portion of the engine of FIG. 1.

The example case structure 62 of FIG. 1A is configured as a generally tubular structure formed in two general sections: an inlet/compressor case 61; and a diffuser/combustor/turbine case 63. The case structure 62, for example, extends axially along the axial centerline 22 from the forward airflow inlet 24 to an outlet 66 from the turbine section 32. The case structure 62 also extends circumferentially about (e.g., completely around) the axial centerline 22 such that the case structure 62 has, for example, a full hoop geometry. The two sections 61, 63 may be secured to each other at a bolt flange joint 65.

The case structure 62 includes one or more case walls. The inlet/compressor case 61 of FIG. 2A, for example, includes a compressor wall 68. The diffuser/combustor/turbine case 63 and its FIG. 2 main piece 200 have a diffuser wall 70, an outer combustor wall 72 of the combustor 50, an inner combustor wall 74 of the combustor 50, the bulkhead wall 56 of the combustor 50, an outer turbine wall 76 and an inner turbine wall 78. Each of these case walls 56, 68, 70, 72, 74, 76 and/or 78 may be generally tubular or generally annular. Each of the case walls 68, 70, 72, 74, 76, 78 of FIG. 1A, for example, is tubular, and the bulkhead wall 56 is annular.

The compressor wall 68 extends axially along the axial centerline 22 between and is connected to the inlet section 36 and the diffuser wall 70. The compressor wall 68 of FIG. 2A circumscribes, axially overlaps and thereby houses the compressor rotor 42.

The diffuser wall 70 extends axially along the axial centerline 22 between and is connected to the compressor wall 68 and an aft end portion of the inner turbine wall 78. The diffuser wall 70 is spaced/displaced radially outboard from and axially overlaps the combustor 50. The diffuser wall 70 of FIG. 1A thereby forms an outer peripheral boundary of the diffuser plenum 58 that surrounds the combustor 50 and the combustor wall 72 locally forms an inner boundary. FIG. 2 also shows diffuser vanes 120 radially between a forward portion of the diffuser wall 70 and an inner wall 122 that merges with the outer platform 80 which, in turn, merges with the combustor outer wall 72.

The outer combustor wall 72 extends axially along the axial centerline 22 between and may be connected to the bulkhead wall 56 and an outer platform 80 of an exit nozzle or turbine inlet vane ring 82 from the combustion chamber 52. The inner combustor wall 74 is circumscribed and axially overlapped by the outer combustor wall 72. The inner combustor wall 74 extends axially along the axial centerline 22 between and may be connected to the bulkhead wall 56 and an inner platform 84 of the exit nozzle 82. The bulkhead wall 56 extends radially between and is connected to aft end portions of the outer combustor wall 72 and the inner combustor wall 74. The case walls 56, 72 and 74 may thereby collectively form peripheral boundaries of the combustion chamber 52 therebetween.

The outer turbine wall 76 may be connected to the exit nozzle outer platform 80. The outer turbine wall 76 projects axially out from the exit nozzle outer platform 80 and extends axially towards/to an aft, downstream end of an inner platform or hub 86 of the compressor rotor 42. This outer turbine wall 76 is circumscribed and axially overlapped by the diffuser wall 70. The outer turbine wall 76 of FIG. 1A may thereby form an inner peripheral boundary of the core flowpath 40 within the diffuser 60, and may form an outer peripheral boundary of the core flowpath 40 within a (e.g., upstream) portion of the turbine section 32. The outer turbine wall 76 of FIG. 1A also circumscribes, axially overlaps and thereby houses a (e.g., upstream) portion of the turbine rotor 44.

The inner turbine wall 78 may be connected to the exit nozzle inner platform 84. An upstream portion of the inner turbine wall 78 projects axially (in the aft-to-forward direction) out from the exit nozzle inner platform 84 to a turning portion of the inner turbine wall 78. A downstream portion of the inner turbine wall 78 projects axially (in the forward-to-aft direction) away from the inner turbine wall turning portion to the turbine section outlet 66. The inner turbine wall 78 is circumscribed and axially overlapped by the combustor 50. The inner turbine wall 78 is also spaced/displaced radially inboard from the combustor 50. The inner turbine wall 78 of FIG. 1A thereby forms an inner peripheral boundary of the diffuser plenum 58 that surrounds the combustor 50. The inner turbine wall 78 forms an outer peripheral boundary of the core flowpath 40 within a (e.g., downstream) portion of the turbine section 32. The inner turbine wall 78 also circumscribes, axially overlaps and thereby houses a (e.g., downstream) portion of the turbine rotor 44.

The static engine structure 34 may also include one or more internal support structures with one or more support members. Examples of support members include, but are not limited to, struts, structural guide vanes, bearing supports, bearing compartment walls, etc. The static engine structure 34 of FIG. 1A, for example, includes a forward support structure 88, an aft support structure 90, an inlet nozzle 92 and the exit nozzle 82. The forward support structure 88 and the inlet nozzle 92 may be configured together. The forward support structure 88 may be configured to support the forward bearing 48A. The aft support structure 90 may be configured to support the aft bearing 48B. The inlet nozzle 92 may be configured to condition the core air entering the compressor section 28. The inlet nozzle 92, for example, may include one or more guide vanes 94 which impart swirl to the core air. The exit nozzle 82 may similarly be configured to condition the combustion products exiting the combustor section 30. The exit nozzle 82, for example, may include one or more guide vanes 96 which import swirl to the combustion products, where these guide vanes 96 are connected to and extend radially between the exit nozzle inner and outer platforms 84 and 80. The static engine structure 34, of course, may also or alternative include various other static/stationary gas turbine engine components.

As discussed above, in an example engine having a reverse flow combustor, an example HPT vane has an outer diameter shroud and an inner diameter platform. The example platform is of generally c-shaped central longitudinal section, having: an outer diameter wall at inner diameter ends of the airfoils; an inner diameter wall spaced radially inward thereof; and forward turn joining those walls. The outer diameter wall generally forms an inner diameter boundary of the gaspath exiting the combustor; the platform turn then forms the inside/aft boundary of a turn of the gaspath radially inward toward the turbine inlet; and the inner diameter wall then forms the outer diameter boundary of the gaspath at or near the turbine section outlet.

In service, the outer diameter surface of the inner platform outer diameter (OD) wall (100 in the FIG. 2 example) may be exposed to some of the hottest temperatures in the engine due to immediate exposure to gas leaving the combustor. Gas expansion in the turbine may cause a reduction in temperature from upstream to downstream over the gaspath-facing surface of the platform (the outer/forward surface of the platform turn 104 and then the ID surface of the ID wall 102). Such temperature gradient can result in differential thermal expansion of the ID wall 102 and OD wall 100. Such differential thermal expansion may cause problems which may include some combination of: performance degradation due to deformation; failure due to fracture; and penalties in weight and performance associated with restraining such deformation. Accordingly, a stress relief feature is added to the platform OD wall such as described further below.

The example stress relief feature is a circumferential array of radial through-openings (gaps or slots) 300 (FIG. 2A) in the platform OD wall 100 extending downstream/forward from its leading end 106 (aft end for the reverse flow combustor). The example slots extend from a respective upstream open end 302 (FIG. 4 OD view and FIG. 5 ID view) and terminate at a terminus 304 (FIG. 5) before reaching the opposite axial extreme 105 of the platform. Thus, they may terminate slightly before reaching the turn or slightly after in various examples. The slots have ID openings 306 (FIG. 8) at/to the ID surface 308 of the OD wall 100 and OD openings 310 at/to the OD surface 312 of the OD wall 100.

Figure 3:
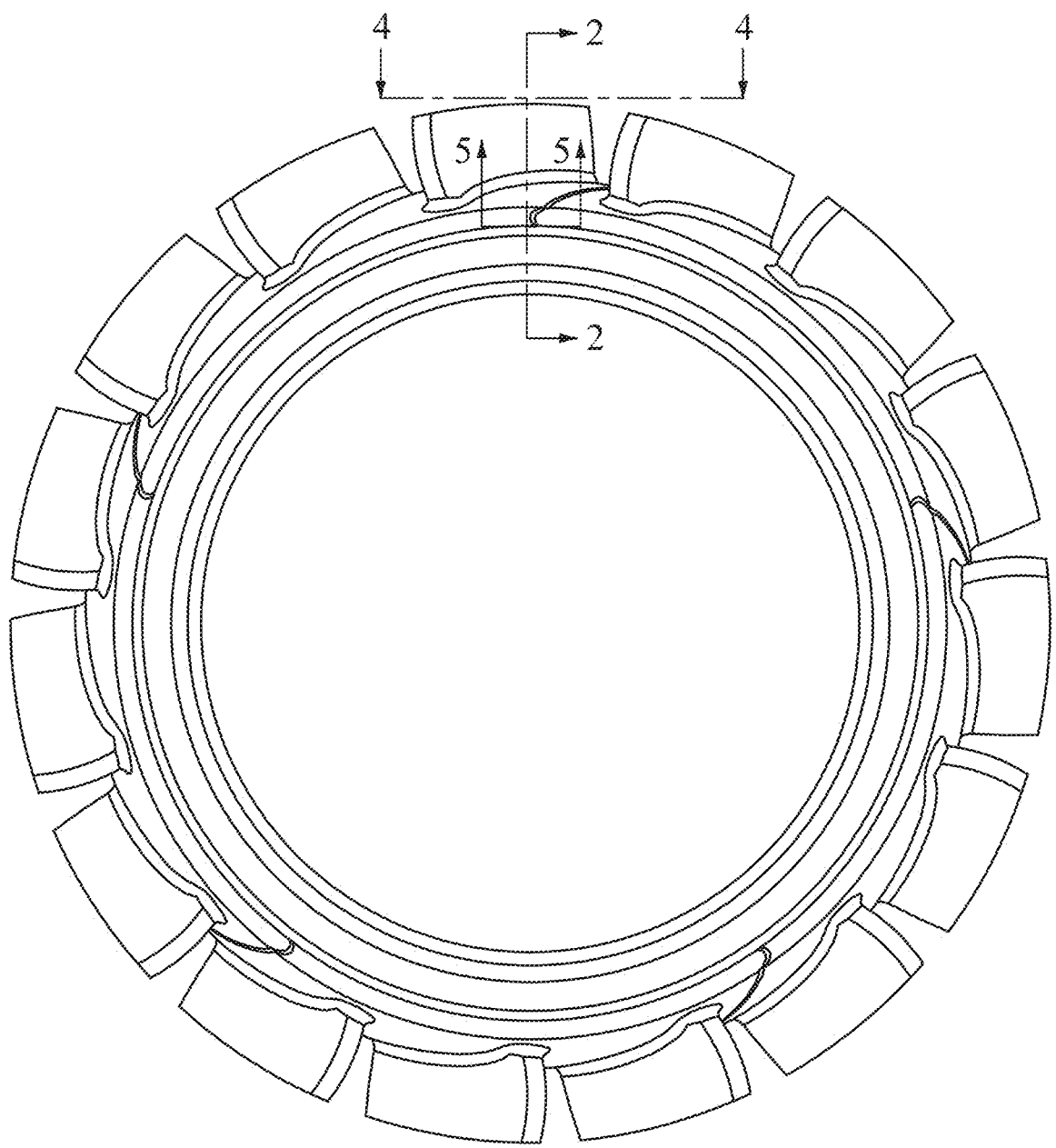
FIG. 3 is a transverse sectional view of the nozzle section of FIG. 2A.

However, the slots represent a potential air/gas leakage path thus compromising efficiency. Accordingly, the number of slots may be limited to provide needed accommodation while limiting performance loss. In the example, the slots are not between every adjacent pair of airfoils. Instead, they are shown in FIG. 3 at an example between every third pair (thus at only one third of the available inter-airfoil gaps). A broader example is every second to fifth gap.

Additionally, the slots may be formed with a convoluted profile such that portions of the OD wall at either circumferential side of the slot interfit with each other. This may, effectively, form a labyrinth seal. Further variations on this are discussed below. In this particular example of a convoluted profile, the convolution is such that a radial line 530 (FIG. 8) will have multiple intersections with the platform in addition to the inherent two intersections. In the particular configuration of FIG. 8, over portions of the slot, there are six intersections.

Figure 8:
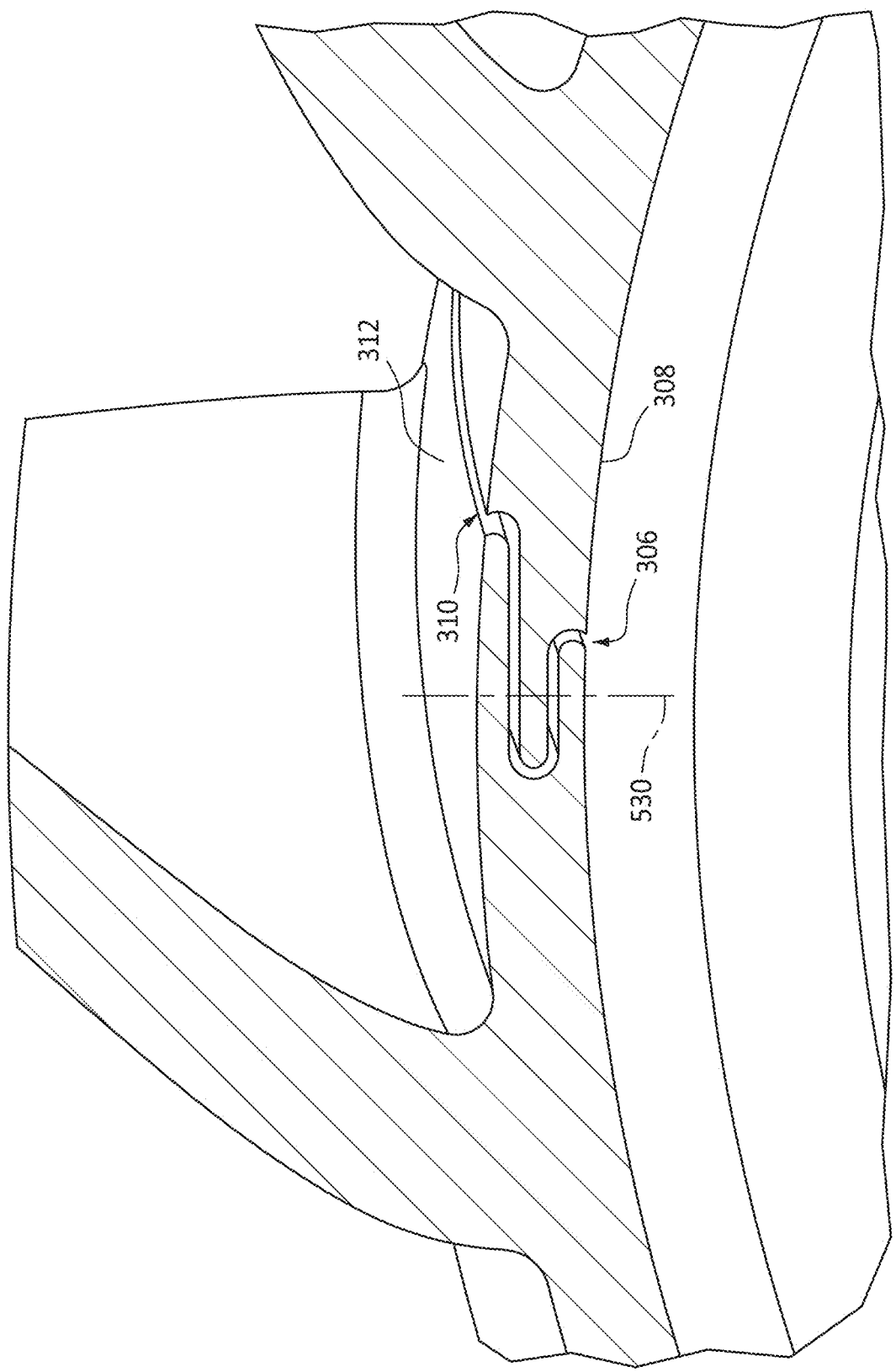
FIG. 8 is a transverse sectional view of inner platform outer wall of the nozzle of FIG. 4, taken along line 8-8.
Figure 9:
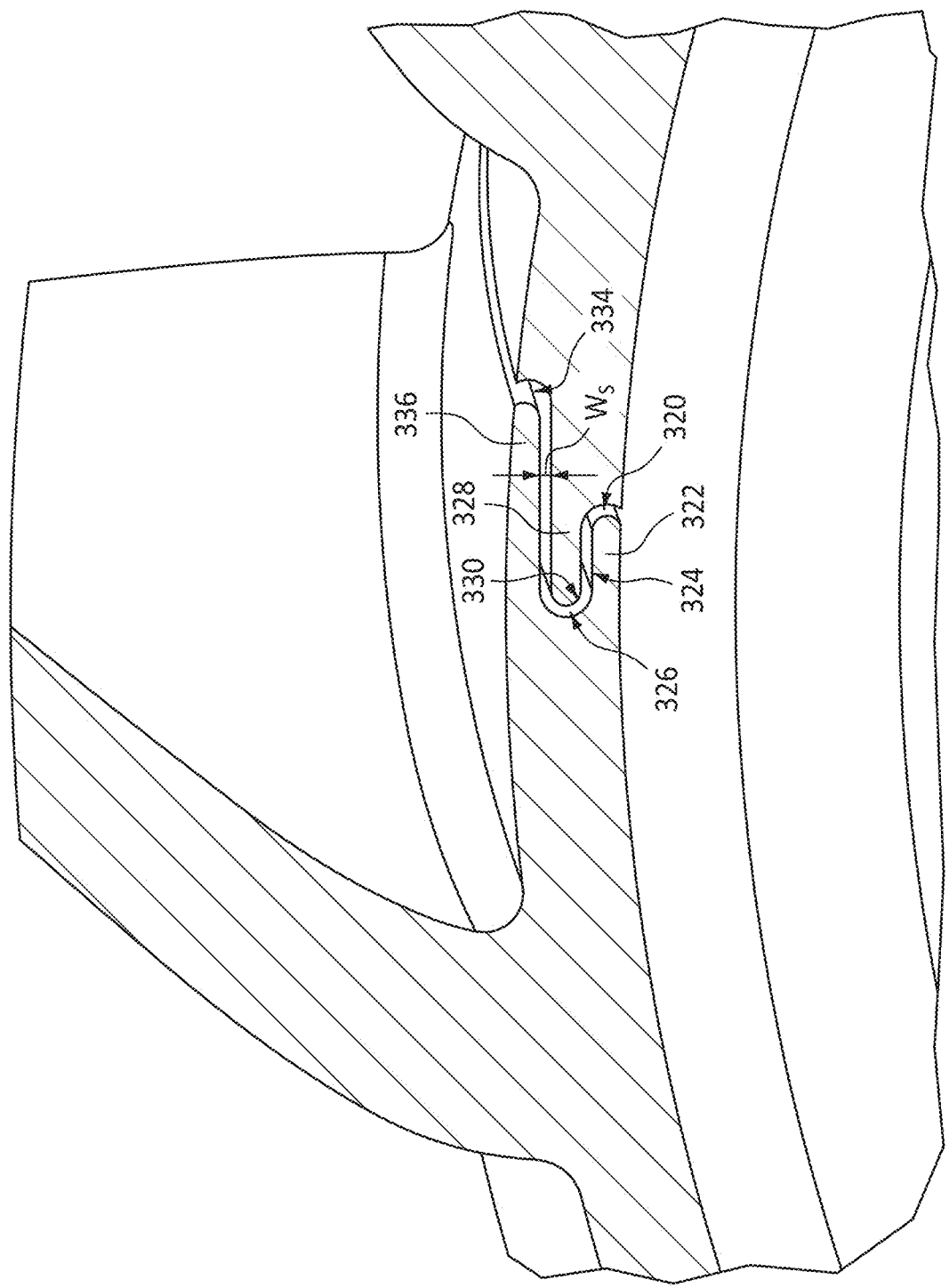
FIG. 9 is a transverse sectional view of inner platform outer wall of the nozzle of FIG. 4, taken along line 9-9.
Figure 10:
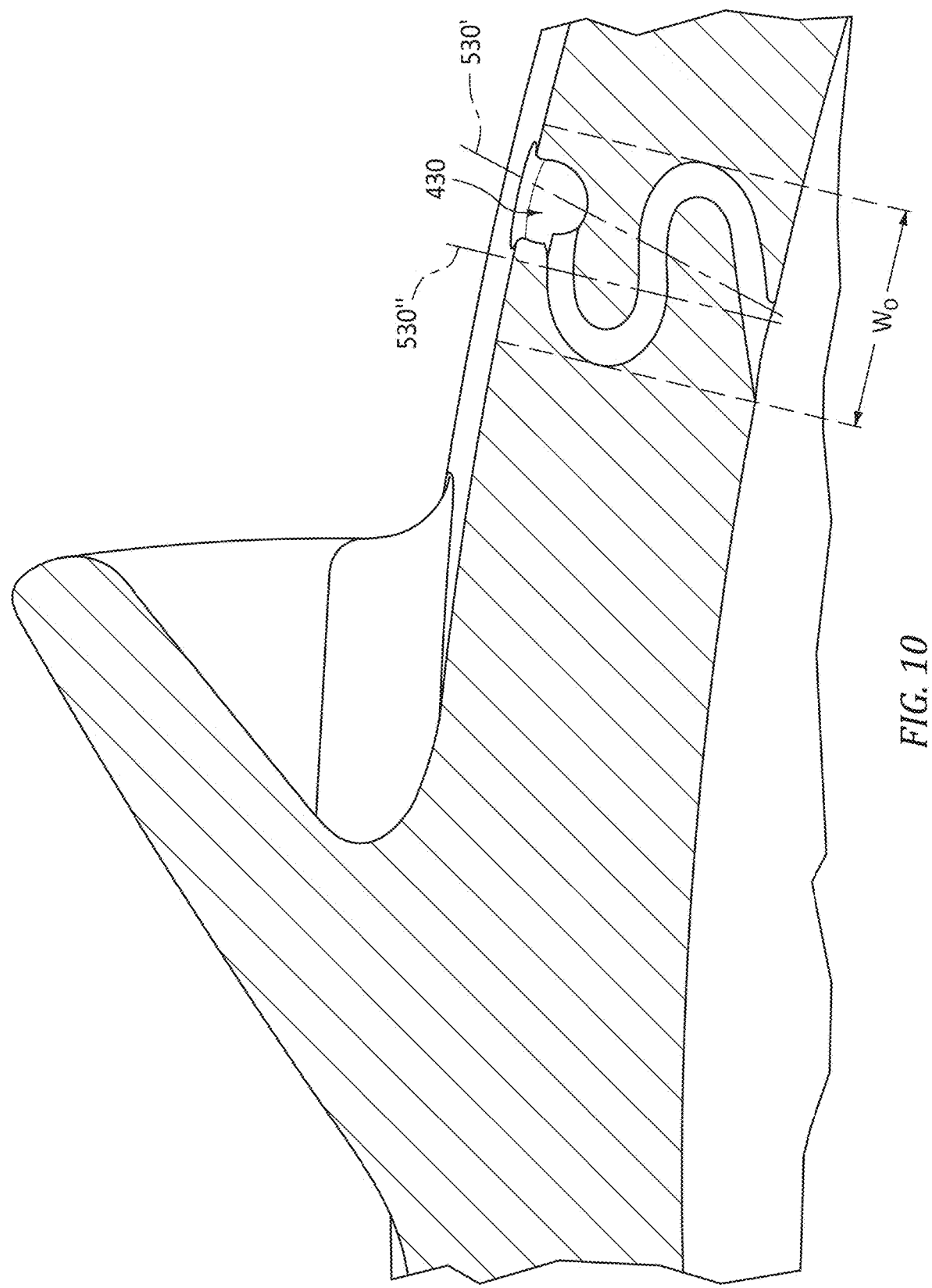
FIG. 10 is a transverse sectional view of inner platform outer wall of the nozzle of FIG. 4, taken along line 10-10.
Figure 11:
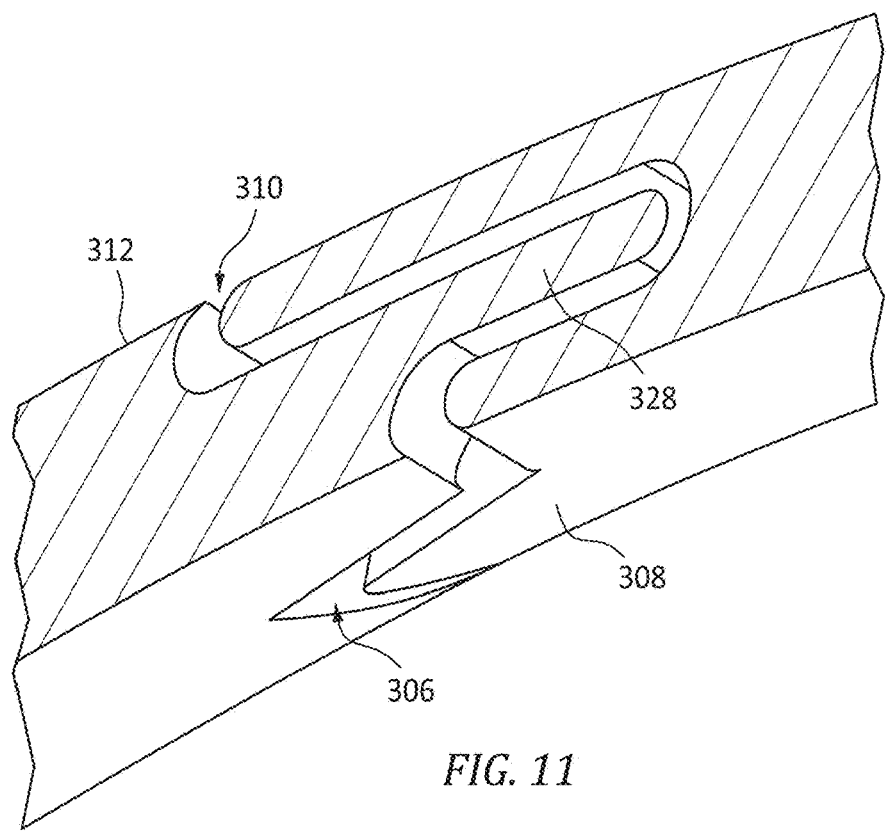
FIG. 11 is a rearward cutaway view of a leading edge region of the inner platform outer wall.
Figure 12:
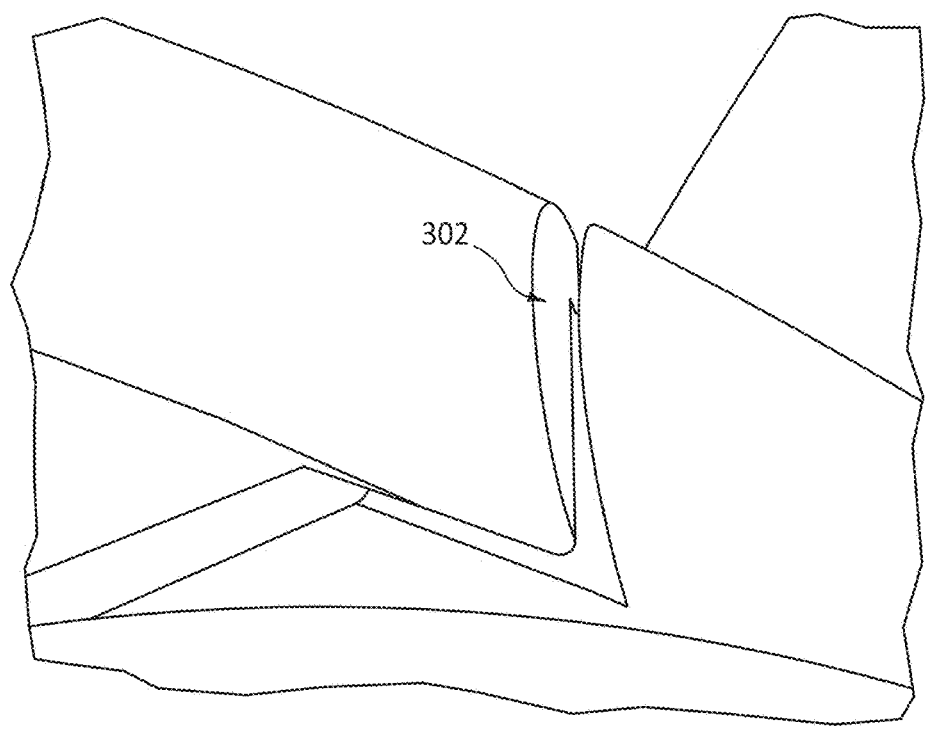
FIG. 12 is a view of the leading edge region of the inner platform outer wall.

The example slot thus has an ID opening 306 and an OD opening 310. The convolution is such that there is, in transverse section, no straight line path between the ID opening and the OD opening. FIG. 8 shows a radial line with six intersections with the material. FIG. 10 shows a slightly off-radial line 530' with four such intersections and a nearby radial line 530" with six. Along most of the length of the slot, from ID to OD, the slot first proceeds radially outward. In this example, an initial outward radial pass 320 (FIG. 9) is along a turn forming the convex end of an ID circumferentially projecting plate like projection 322 to one side (the counterclockwise side looking forward in the example). In the example, this finger protrudes in a circumferential direction (clockwise) from the pressure side of one adjacent airfoil toward the suction side of the other. The slot then turns in a circumferential direction (counterclockwise in the example) having an inner circumferential leg 324 extending back toward the pressure side. The slot then again turns radially outward in an arcuate turn 326 bounding the convex end of an intermediate circumferential projection 328 (on the clockwise side) and concave trough/base of a channel 330 (on the counterclockwise side). The slot then again turns circumferential in an outer circumferential leg 332, finally turning back radially outward at turn 334 to form the convex end of an outer/OD circumferential projection 336 at the OD opening 310.

Figure 4:
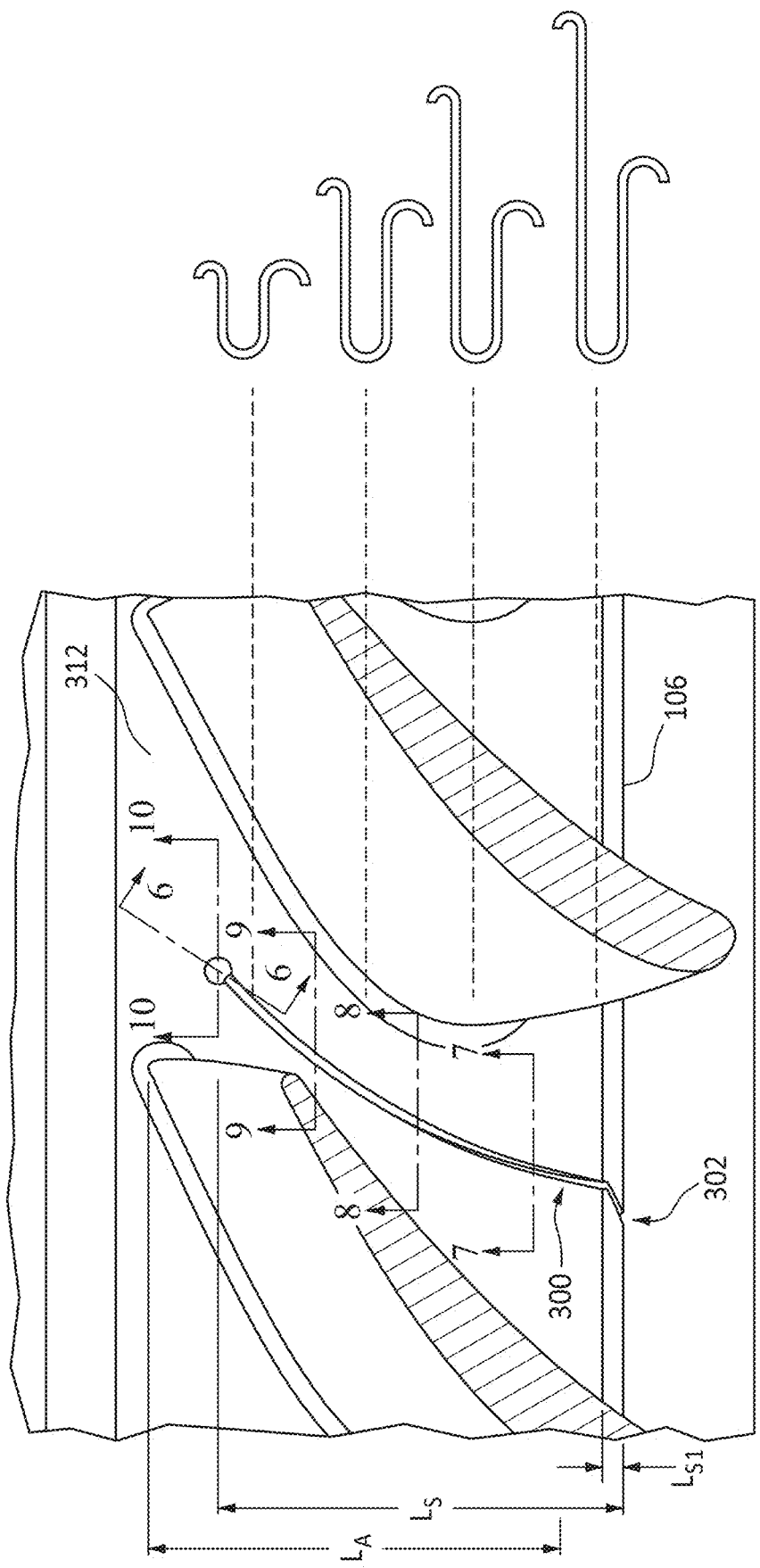
FIG. 4 is a view of an inner platform OD surface in the nozzle section of FIG. 3 with schematic projections of slot geometry.
Figure 5:
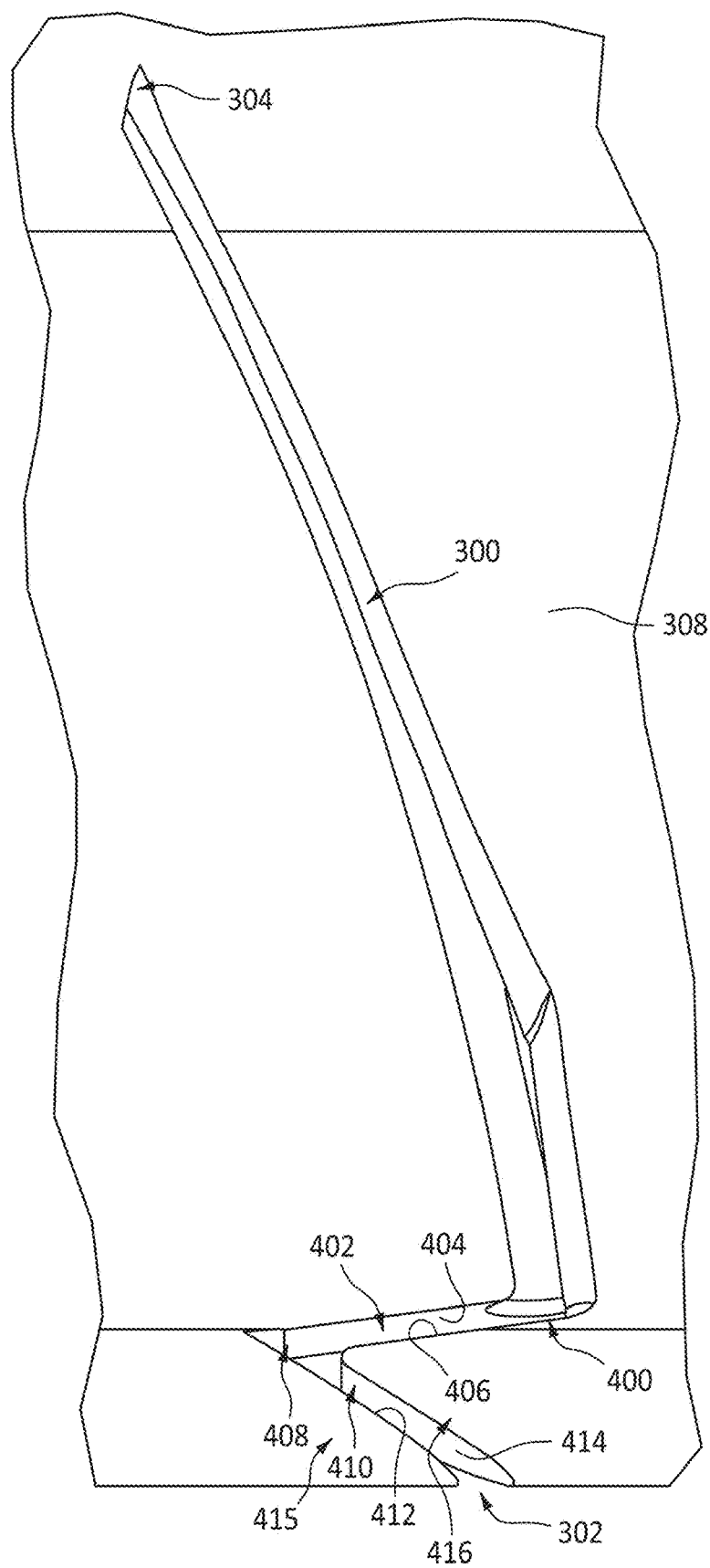
FIG. 5 is a view of an inner platform OD surface in the nozzle section of FIG. 3.

This general cross-sectional shape is along a majority of the axial length $L_S$ (FIG. 4) of the slot. There are transitions near the leading end/rim of the platform outer wall to help block combustion gas from axially infiltrating the slot. This is achieved by having the slot not simply extend in the aforementioned cross-sectional shape all the way to the leading end/rim 106 of the platform. Instead, the slot extends in said interlocking projections to a location short of the leading end/rim and then takes a sharp circumferential turn 400 (FIG. 5) so as to have a segment/leg 402 largely defined between radially and circumferentially extending faces 404, 406 of the shroud at opposite sides. The slot then sharply turns 408 extends diagonally (aft and with an opposite circumferential component) along a leg 410 between radially and circumferentially extending faces 412, 414 to the leading end/rim. This creates nesting sections 415,416 of the leading rim so that any combustion gas flow driven will have to make multiple turns to then enter the main portion of the slot. As is discussed below, such a labyrinthine cross-section may start after a leading region of span $L_{S1}$ (FIG. 4). Example $L_{S1}$ is a relatively short span (e.g., 3% to 10% or 3% to 15% of $L_S$).

Figure 2A:
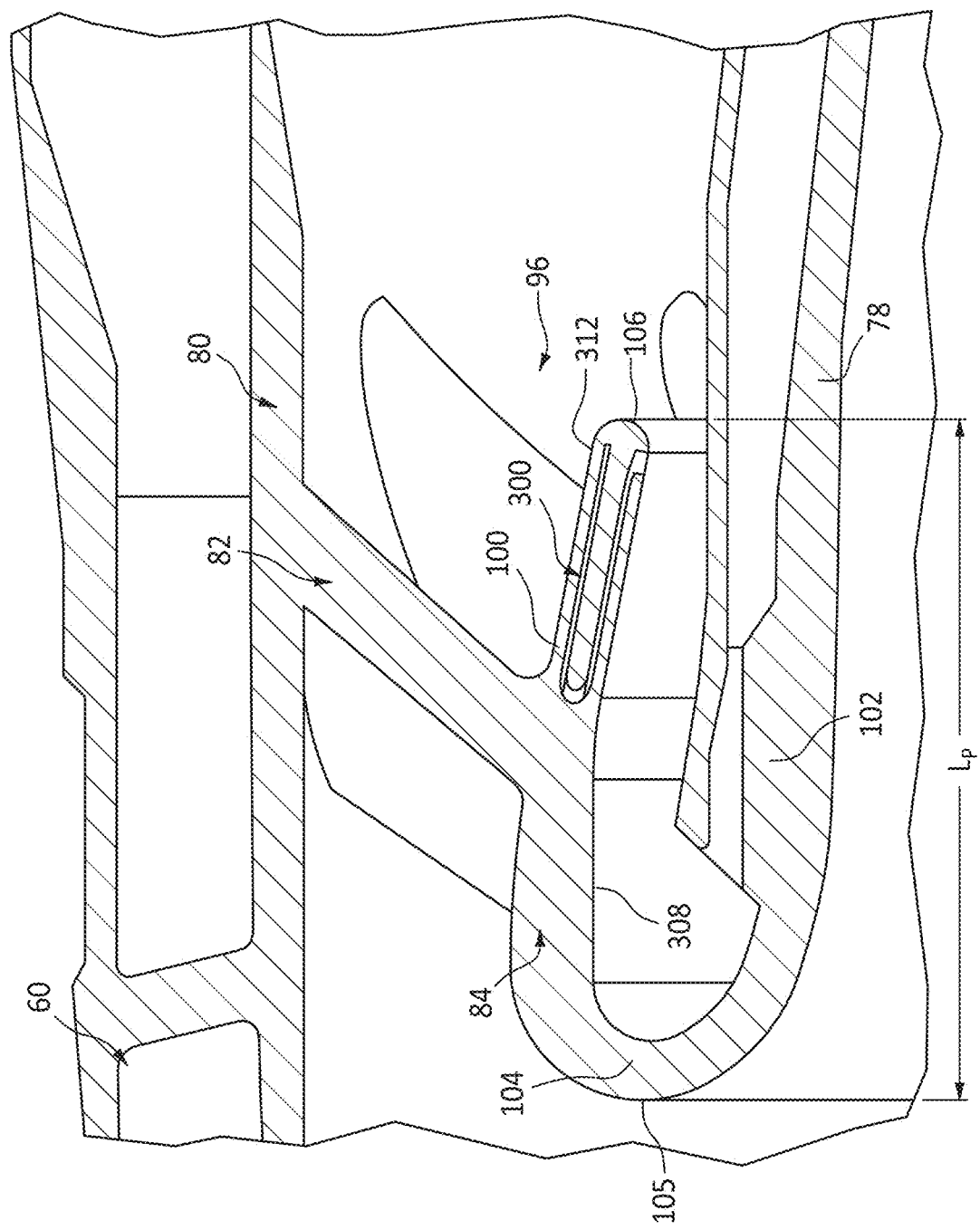
FIG. 2A is an enlarged view of the turbine inlet nozzle section of the body of FIG. 2

As shown in FIG. 2A, as a characteristic platform length for the example reverse flow C-sectioned platform, a length $L_P$ is defined as from the leading edge 106 of the platform to the forward extreme 105 of the turn 104. In an alternative platform length lacking the C-shaped section, an alternative length may be simply between leading and trailing ends of a non-arcuate cross-section. Additionally, an airfoil length at the platform is shown as $L_A$ (FIG. 4).

Example $L_S$ is about 100% of $L_A$, more broadly, 50% to 130% or 90% to 110%. Example $L_S$ is about 70% of $L_P$, more broadly, 30% to 90% or 40% to 80% or 50% to 75%. The convoluted/labyrinthine profile blocking radial line of sight and, more generally, all ID to OD line of sight extends over a length of at least 50% of $L_S$, more particularly, at least 70% or 70% to 97% in embodiments that have a leading line of sight region of length $L_{S1}$ as discussed above.

Figure 6:
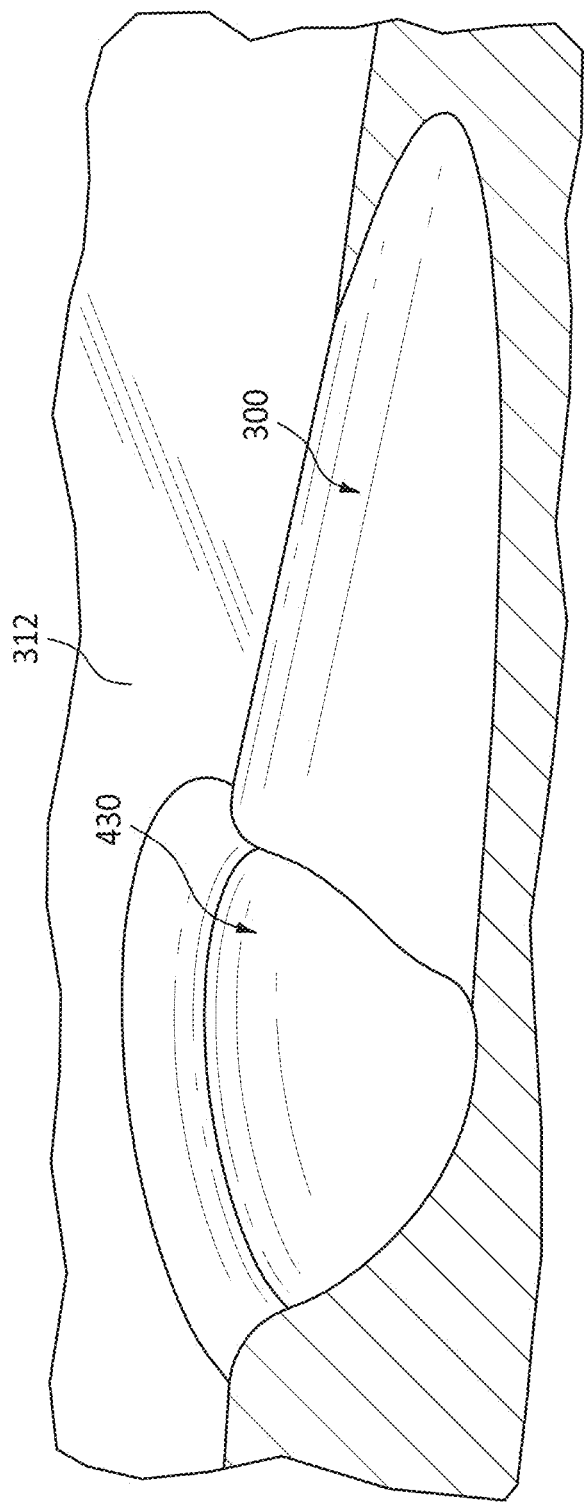
FIG. 6 is a sectional view of a slot terminus.
Figure 7:
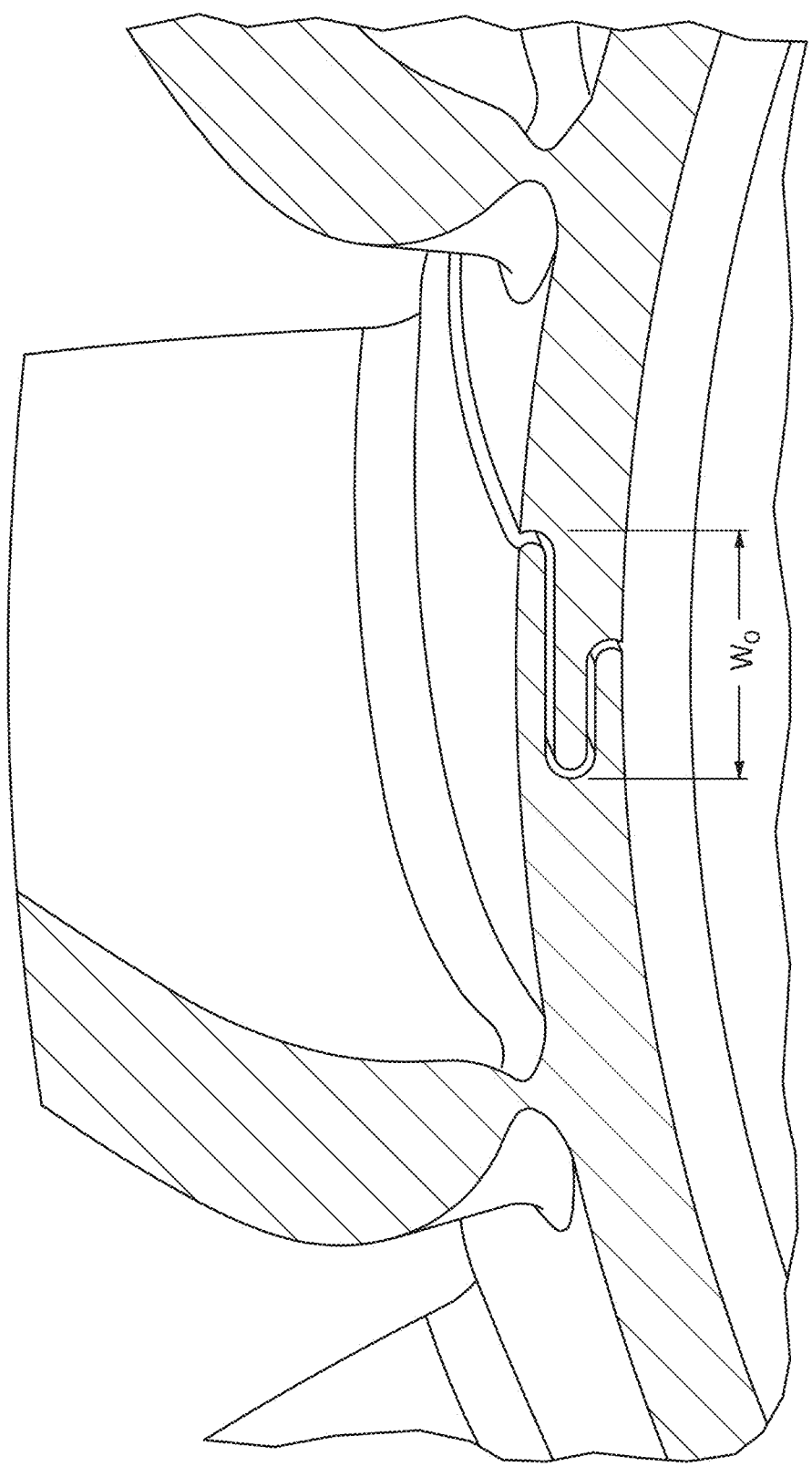
FIG. 7 is a transverse sectional view of inner platform outer wall of the nozzle of FIG. 4, taken along line 7-7.

Additionally, as shown in FIGS. 7-10, the slot cross-sectional overall dimension (width $W_O$ which may be measured as a linear dimension or an angle) of the slot may decrease from the beginning of the convolution toward the terminus. This accommodates progressive thermal expansion from upstream to downstream (aft to fore in the reverse flow combustor). Additionally, the terminus includes a concave stress relief feature 430 (FIG. 6) at the OD surface. The ID surface 308 is cooler than the OD surface 312 because it is exposed to pre-combustion dilution air 315 (FIG. 1A).

Axially (longitudinally) and streamwise, the slots start at the leading/upstream end/rim of the platform and can extend up to the trailing edge of the vane airfoils. An example longitudinal span is at least half the longitudinal span of the airfoils at the platform and terminating at least 75% of the chord or the longitudinal length. As the engine runs, temperatures increase, resulting in thermal expansion of material. The slots accommodate differential thermal expansion (due to streamwise gradient along the platform outer wall, due to gradient radially across the platform outer wall, and/or due to radial gradient causing differential expansion between the platform outer wall on the one hand and the platform inner wall and/or shroud on the other hand). This accommodation may improve durability, allowing increased lifespan and/or greater operational parameter domain.

Radially, the slots act as a tortuous path, so combustor cooling air is less likely to bleed through the platform and instead enter the combustion chamber. The path is a series of interlocking concentric (arcuate with center of curvature at or near the engine centerline/rotation axis) features which enables material expansion whilst limiting the amount of bleed air.

An example slot width $W_S$ (face to face) is 0.010 inch (0.25 millimeters, more broadly 0.20 millimeter to 1.0 millimeter with alternative upper ends of 0.40, 0.50, and 0.75 millimeter). The slot begins with a narrow opening then expands into a more labyrinthine profile with respect to travel along the platform. In the illustrated example, a portion of the slot at leading edge 106 and extending from the opening 302 extends generally radially from ID surface 308 to OD surface 312 and zigzags circumferentially and forward until the transition to the labyrinthine profile. Circumferentially projecting axial overlap of sections 415, 416 (FIG. 5) of the leading portion thus block axial access (along a majority of a radial span) but may have a radial or near radial line of sight openness/clearance. The labyrinthine profile lacks radial or near radial line of sight openness but is more axially open between the transition from the leading portion to the terminus. Thus, from the open end 302. the transverse section of the slot appears close to a radially extending rectangle, abruptly transitioning to the convoluted shape at the end of the leg 402.

In this instance, the main section of the slot is formed of a passage with bends, the lengths of which are concentric to the platform. This ensures that as the material grows, it doesn't impinge on itself generating stress concentrations.

In use, differential heating will cause the leading end of the platform to heat more and thus expand more than the trailing (forward) end. This causes the slot to circumferentially constrict, further improving sealing and reducing any leakage flow. The circumferential width of the slot will decrease, locally substantially reducing $W_S$ at the circumferential end/tips of the projections 322,328, 336.

The sectional views of FIGS. 7-10 show how the passage profile changes. This tortuous passage restricts flow from bleeding through the bottom of the platform instead of passing around and entering through the turbine vane inlet.

The slot terminates with a small roughly hemispherical feature on the OD face which helps reduce effects of stress concentration. The feature does not perforate both sides of the platform and thereby does not cause additional gas bypass through the platform. Without this feature, the slot would act as a crack initiation site. The illustrated example includes this feature at the OD. In other examples, there may be a similar such feature at the ID.

Figure 13:
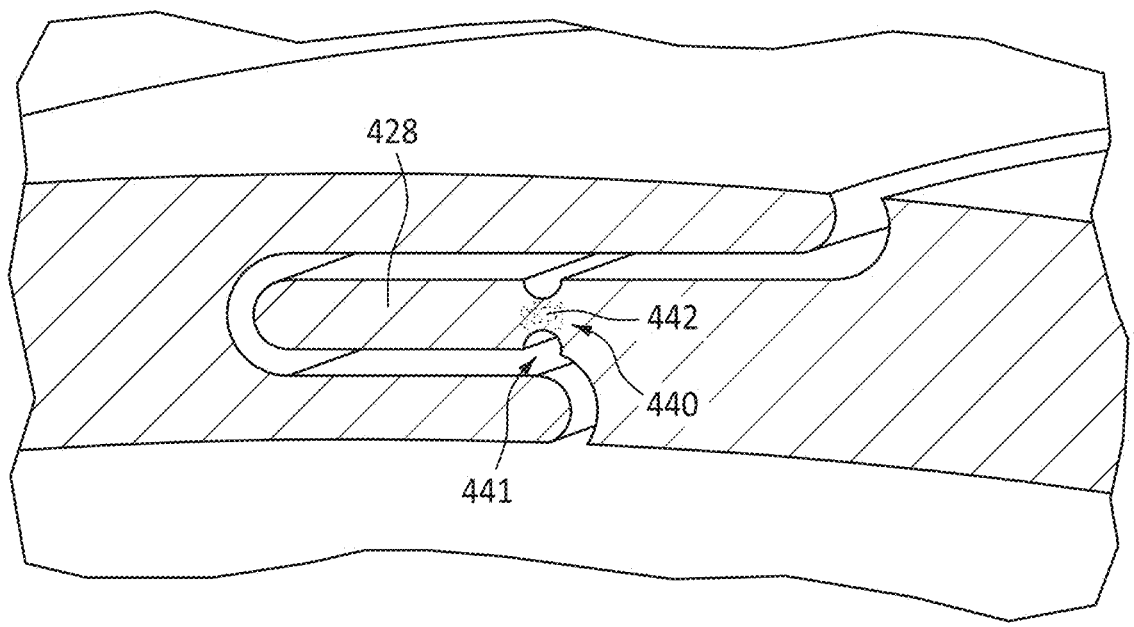
FIG. 13 is a sectional view showing a severable projection for forming a seal.

Additionally, in some examples, the slot may include an integral feather seal which may be configured to deform during engine operation and help close the bypass passage. In the specific example, the intermediate projection 328 may be allowed to deform or fracture. For example, a weakened region 440 (FIG. 13) of projection 428 may be formed near a proximal/root end of the projection allowing the portion distally thereof to deflect radially outward and seal against the ID face/side of the OD/outer projection. For example, the projection can be additively defined in a way that the weakened region is necked from ID and/or OD by channels 441.

Figure 14:
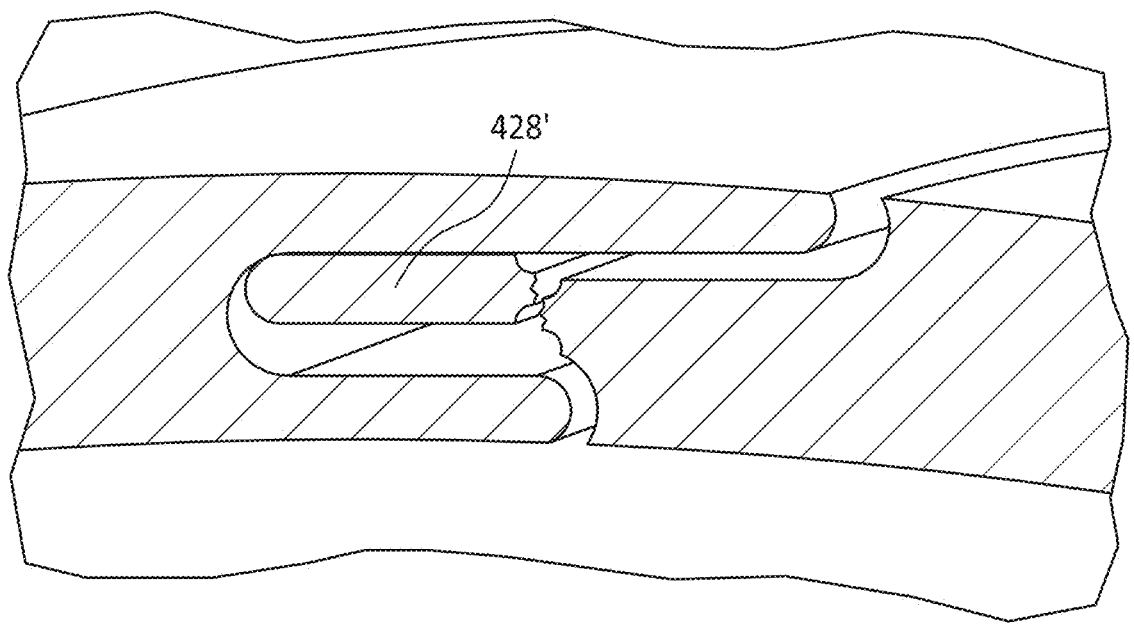
FIG. 14 is a sectional view showing the projection severed.

Such region where the projection/seal connects to the remainder of the platform may additionally or alternatively contain induced porosity 442 allowing the seal to deflect easier (e.g., hinging at the region 440) or even detach. The necked region 440 (or unnecked) could be parametrically defined in the PBF process to contain porosity 442 to aid in deflection or liberation. If the seal disconnects (FIG. 14) it will allow the platform to flex and block gas bypass. The example PBF process may achieve such porosity via control of speed (laser relative to bed) and feed (laser power) in what would be an otherwise undesirable combination such as increased/excess speed and/or decreased/insufficient power. The result is macroporous so-called "key hole" defects. An example porosity of the region is at least 10% or at least 50%. Away from the region, example material is near fully dense (e.g., 99% or more). An example porosity difference or delta is at least 10% or at least 50% or an example 50% to 80% or 50% to 75% between porous material of the region relative and remaining material of the platform.

Component materials and manufacture techniques and assembly techniques may be otherwise conventional.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

A difference in porosity is measured in absolute terms. Thus, a region of 10% porosity has a difference of 5% relative to a region of 5% porosity (not a relative difference of 100%).

One or more embodiments have been described. Nevertheless, it will be understood that various modifications may be made. For example, when applied to an existing baseline cluster configuration, details of such baseline may influence details of particular implementations. Accordingly, other embodiments are within the scope of the following claims.

What is claimed is:

1. A vane cluster comprising:
   a platform;
   a shroud; and
   a plurality of airfoils joining the platform to the shroud, wherein:
   the platform, shroud and airfoils are portions of a single piece;
   the platform has a plurality of openings, each opening between a respective two of the airfoils;
   the openings extend from a leading end of the platform toward a trailing end of the platform; and
   the openings have a convoluted shape such that in transverse section a radial line has at least four intersections with the platform.

2. The vane cluster of claim 1 being a full annulus.

3. The vane cluster of claim 2 wherein:
   every third inter-airfoil space has a said opening.

4. The vane cluster of claim 1 wherein the platform comprises:
   an outer wall having the openings;
   an inner wall spaced radially inward of the outer wall; and
   a turn joining the inner wall and outer wall.

5. The vane cluster of claim 4, further comprising:
   a diffuser including diffuser vanes extending radially outward from the shroud;
   a case wall at outer diameter ends of the diffuser vanes; and
   a combustor body having an inner wall extending forward to merge with the platform along an outer diameter of the platform inner wall.

6. The vane cluster of claim 1, wherein: said radial line has six said intersections.

7. The vane cluster of claim 1 wherein the opening shape defines:
   at a first circumferential side, a channel opening toward an opposite second circumferential side; and
   at the second circumferential side, a projection into the channel.

8. The vane cluster of claim 7, wherein the projection has one or more of:
   a necked area of reduced radial span; and
   a porous zone, optionally being said necked area if present, of at greater porosity than an adjacent portion of the platform, with a porosity difference of at least 50%.

9. The vane cluster of claim 1 wherein one or more of:
   the openings have an axial span of 50% to 130% of an axial span of the airfoils at the platform;
   no more than half of inter-airfoil spaces have said openings; and
   the openings have an axial span of 30% to 90% of an axial span of the platform.

10. A gas turbine engine including the vane cluster of claim 1 as a turbine section vane cluster and further comprising:
    a compressor section;
    a combustor; and
    a gaspath defining a downstream direction sequentially through the compressor section, combustor, and turbine section.

11. The gas turbine engine of claim 1 wherein:
    the engine is a single-spool engine;
    the compressor section is a centrifugal compressor; and
    the combustor is a reverse flow combustor.

12. The gas turbine engine of claim 11 wherein the vane cluster further comprises:
    a diffuser including diffuser vanes extending radially outward from the shroud;
    a case wall at outer diameter ends of the diffuser vanes; and
    a combustor body.

13. A method for manufacturing the vane cluster of claim 1, the method comprising:
    additive manufacture forming the openings.

14. The method of claim 13 wherein the additive manufacturing comprises:
    powder bed fusion.

15. A method for using the vane cluster of claim 1, the method comprising:
    running the vane cluster as a turbine vane cluster in a gas turbine engine; and
    the running causing thermal expansion of the leading end relative to the trailing end and circumferentially closing the openings.

16. The method of claim 15 wherein:
    the running causes contact of a projection at one circumferential side of the opening with a channel at the other circumferential side of the opening.

17. The method of claim 16 wherein:
the contact includes rupturing a root section of the projection.

18. A vane cluster comprising:
a platform;
a shroud; and
a plurality of airfoils joining the platform to the shroud, wherein:
   the platform has a plurality of openings, each opening between a respective two of the airfoils;
   the openings extend from a leading end of the platform; and
   the openings define:
      at a first circumferential side, a channel opening toward an opposite second circumferential side; and
      at the second circumferential side a projection into the channel.

19. A vane cluster comprising:
a platform;
a shroud; and
a plurality of airfoils joining the platform to the shroud, wherein:
   the platform has a plurality of openings, each opening between a respective two of the airfoils and forming means for accommodating differential thermal expansion of a leading end of the platform relative to a trailing end of the platform.

20. The vane cluster of claim 19 wherein:
the vane cluster is a single-piece full annulus.

* * * * *